United States Patent [19]
Droste

[11] Patent Number: 4,584,228
[45] Date of Patent: Apr. 22, 1986

[54] BULLET-PROOF VEST OR THE LIKE

[75] Inventor: Reinhard Droste, Wuppertal, Fed. Rep. of Germany

[73] Assignee: Akzo Nv, Arnhem, Netherlands

[21] Appl. No.: 766,009

[22] Filed: Aug. 15, 1985

[30] Foreign Application Priority Data

Aug. 25, 1984 [DE] Fed. Rep. of Germany ... 8425173[U]

[51] Int. Cl.⁴ ............................................. B32B 3/28
[52] U.S. Cl. .................................. 428/182; 428/246; 428/911
[58] Field of Search ................. 428/68, 72, 178, 224, 428/911, 246, 182, 184, 186

[56] References Cited

U.S. PATENT DOCUMENTS 4,212,692 7/1980 Rasen et al. .................... 156/167

FOREIGN PATENT DOCUMENTS 4856972 5/1974 Australia .

Primary Examiner—James J. Bell
Attorney, Agent, or Firm—Parkhurst & Oliff

[57] ABSTRACT

A bullet-proof garment including several layers of textile fabric or foil superimposed on a shock absorber, in which the shock absorber is a three-dimensional fabric with waffle-like surfaces, a hollow part of at least 90% by volume and a thickness of 5 to 30 mm. Such fabrics are distinguished by good pressure resistance and make possible a good conversion of energy.

13 Claims, 4 Drawing Figures

BULLET-PROOF VEST OR THE LIKE

TECHNICAL FIELD

The invention relates to a bullet-proof garment such as a vest or the like comprising several layers of textile fabrics, a shock absorber on the side facing the body and, optionally, an additional armor plate on the side facing away from the body.

BACKGROUND OF THE INVENTION

Protective vests or such protective pieces of clothing are intended to protect the wearer from the effects of projectiles and also in part from other mechanical effects. The area to be protected can be limited to the upper body (usually circular protection), or it can also include the lower torso, usually with limitation of mobility. The protective vest should not only prevent the pentration of the projectile but also avoid injuries which could be produced by a transfer of the impact of the pojectile to the body.

The consistency and mode of operation of bullet-proof vests are described in detail in the journal "Meilliand Textilberichte", 6/1981, pp. 463 to 468. A protective vest of the type involved in the present invention is described in the left column of page 464 in conjunction with FIG. 4. Accordingly, pure textile vests comprise a rather large number of superimposed textile fabrics, e.g., fabrics of aramide yarns, and a so-called shock absorber is located on the body side which can comprise, for example, foam, a needle fleece or a flat down padding. This shock absorber has the task of reducing the impact of the projectile striking into the textile layers and the shock waves emanating from the point of impact. In armored protective vests, an additional plate of hard material ("armor plate") is provided on the side facing away from the body which can usually be inserted into a pocket.

The shock absorber has the task of reducing a bulging of the textile layers in the direction of the effect of the projectile, i.e., in the direction of the human body. This deformation results in the so-called trauma effect, which is expressed in wounds to the skin and the musculature (surface skin abrasions, hemorrhages, bleeding, contusions, broken ribs, pulmonary contusions) and can in extreme cases result in death.

Other details concerning the subject "shock absorber" are contained in the article "Behaviour of Aramide Fabrics under Ballistic Action" in "Meillian Textilberichte", 3/1981, pp. 193 to 198, especially pp. 197 to 198.

The previously known shock absorbers, which should not increase the weight of the protective vest too much and not be to stiff in order to assure the textile character of the protective vest, allow impression depths under fire under standard conditions which are not able sufficiently to reduce the trauma effect. Thus, a shot in accordance with protective class I of the Technical Guideline "Protective Vest" of the German Police (as of June, 1983) with 9 mm para-soft core from an automatic pistol onto 26 layers of aramide fabric (normal construction) with a 12 mm thick foam plate results in an impression depth of more than 20 mm.

SUMMARY OF THE INVENTION

An object of the present invention is to provide a protective vest of the textile type with a shock absorber which provides a decreased impression depth and thereby leads to a reduction of the trauma effect. Preferably, the textile character of the protective vest should not be very much affected, even though the previously customary type of shock absorbers of "easily deformable materials" (cf. Meilliand, 3/1982, 197) is used as a starting point.

The invention achieves this object as follows: The shock absorber is a three-dimensional fabric with waffle-like surfaces, a hollow part of at least 90% by volume and a thickness of 5 to 30 mm. Such fabrics are distinguished by good pressure resistance and make possible a good conversion of energy.

DETAILED DESCRIPTION OF PREFERRED EMBODIMENTS OF THE INVENTION

According to a preferred embodiment of the invention, the shock absorber comprises a matting comprising a plurality of threads with a diameter of 0.2 to 1.5 mm which are melt spun from synthetic polymers, cross over each other in places and are welded to each other at the cross-points. Such a matting and its production are described in German Pat. No. 25 30 499. The hump profile to which the threads are spun out can have a hump density of between 9 and 400 humps per square decimeter, depending on the thickness of the matting. The humps exhibit a height of approximately 5 to 30 mm and preferably the shape of truncated pyramids, truncated cones or the like. Other acceptable shapes are cited in U.S. Pat. No. 4,212,692. Mats with a corrugated structure are also included within the invention (see FIG. 7 of U.S. Pat. No. 4,212,692).

According to another preferred embodiment of the invention, attractive on account of a very low weight per area unit, the shock absorber comprises a three-dimensional foil sheet. The manufacture and preferred embodiments of such foil sheets are taught, for example, in German Offenlegungsschrift No. P 33 12 667.4 of April 8, 1983. Even the drainage elements of German Offenlegungsschrift 31 27 265 can be used as such shock absorbers. The humps can exhibit dimensions and shapes similar to those of the macrofilament mattings in accordance with German Pat. No. 25 30 499 and U.S. Pat. No. 4,212,692 described above.

If a three-dimensionally structure foil sheet produced by deep drawing is used as the shock absorber, it is preferable to use a hump density of up to 1600 humps per square decimeter. Such foil sheets possess great flexibility, which is compatible with the textile character of the protective vest. Examples of such foil sheets are given in Australian Patent Application No. 48 569/72, especially in FIGS. 5 and 6.

The invention will now be explained with reference to the attached drawings.

FIG. 1 shows a known protective vest. Textile layer 1 comprises, for example, 26 layers of normal aramide fabrics to which a 12 mm thick foam plate 2 has been fastened on the body side as a shock absorber.

Figure 2:
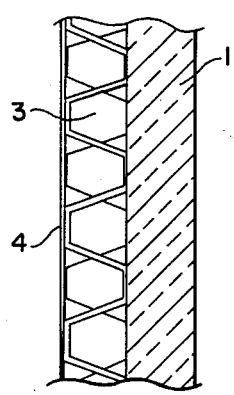
FIGS. 2 and 4 show embodiments of a protective vest in accordance with the invention.
Figure 1:
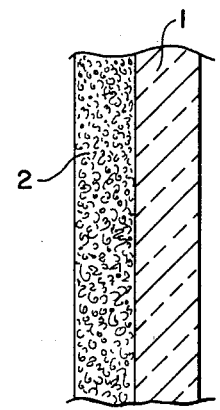
FIG. 1 shows a protective vest in accordance with the state of the art.

FIG. 2 shows a protective vest in accordance with the invention, wherein textile layer 1 is of a customary type (e.g. as in FIG. 1). A commercially available drainage mat (trademark "ENKADRAIN") with a total thickness of 23 mm and comprising matting 3 in accordance with German Pat. No. 25 30 499 and U.S. Pat.

No. 4,212,692 with humps approximately 20 mm high shaped like truncated pyramids and of spun fleece 4 is positioned on the body side. While matting 3 preferably comprises polyamide 6, spun fleece 4 is preferably a polyester fleece. Under fire according to protective class I (see above), the impression depth of the protective vest of FIG. 2 is only 9 mm, compared to 26.5 mm with a protective vest in accordance with FIG. 1.

Figure 3:
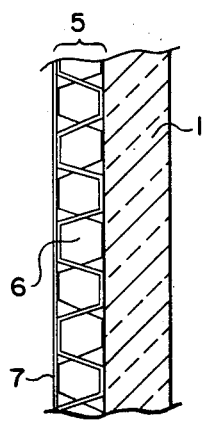

The protective vest of FIG. 3 has a thinner shock absorber 5 which comprises three-dimensionally structured foil sheet 6 backed with spun fleece 7. The foil sheet is preferably a polyester, polyamide, polyolefin, polycarbonate or polyvinylchloride sheet.

Figure 4:
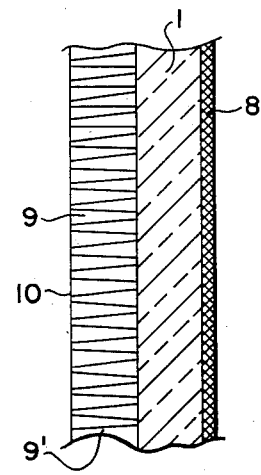

Finally, FIG. 4 shows a so-called armored protective vest according to the invention. Armor plate 8 (hard material) is located on the side of textile layer 1 facing away from the body, optionally in a pocket (not shown), and a shock absorber of three-dimensionally structured foil sheet 9 backed with spun fleece 10 is located on the body side. Foil sheet 9 is produced by deep drawing, whereby humps 9' can have very small cross sections (high hump density). The embodiment of the shock absorber in accordance with FIG. 4 is very flexible, so that it is preferably used without armor plate 8.

While the above description is believed to convey a good understanding of the invention, various modifications to the present invention will now be readily apparent to those of ordinary skill in the art. Thus, the scope of protection to be afforded to the present inventors is not to be limited by the above description, but only by the appended claims.

What is claimed is:

1. A bullet-proof garment product, comprising several layers of textile fabrics on a first side and a shock absorber on a second side, wherein the shock absorber is a three-dimensional fabric comprising a plurality of humps projecting in a direction substantially perpendicular to a plane of said fabrics and having a hollow part of at least 90% by volume, said humps having a height of 5 to 30 mm.

2. The product of claim 1, wherein said shock absorber has a hump density of between 9 and 1600 humps per square decimeter.

3. The product of claim 1, wherein the shock absorber comprises a matting of a plurality of threads with a diameter of 0.2 to 1.5 mm, said threads being melt spun, crossing each other in places and being welded to each other at said places.

4. The product of claim 2, wherein said shock absorber has a hump density between 9 and 400 humps per square decimeter.

5. The product of claim 1, wherein the shock absorber is a three-dimensionally structured foil sheet.

6. The product of claim 5, wherein said shock absorber has a hump density between 9 and 1600 humps per square decimeter.

7. The product of claim 5, wherein said hump density is about 1600 humps per square decimeter.

8. The product of claim 5, wherein said foil comprises at least one member selected from the group consisting of polyester, polyamide, polyolefin, polycarbonate and polyvinylchloride.

9. The product of claim 1, wherein said humps have a height of about 20 mm.

10. The product of claim 1, wherein said humps have a shape selected from the group consisting of truncated cones and truncated pyramids.

11. The product of claim 1, wherein said humps are in the form of corrugation in said shock absorber.

12. The product of claim 1, further comprising a layer of spun fleece on said second side.

13. The product of claim 1, further comprising armor plate on said first side.

* * * * *